(12) United States Patent
Feldman

(10) Patent No.: US 6,540,041 B2
(45) Date of Patent: Apr. 1, 2003

(54) VEHICLE OCCUPANT GAS RESTRAINING SYSTEM

(76) Inventor: Yakov Feldman, 7705 Hampton Ave., Apt. 215, West Hollywood, CA (US) 90046

( * ) Notice: Subject to any disclaimer, the term of this patent is extended or adjusted under 35 U.S.C. 154(b) by 0 days.

(21) Appl. No.: 09/832,493

(22) Filed: Apr. 11, 2001

(65) Prior Publication Data

US 2002/0148667 A1 Oct. 17, 2002

(51) Int. Cl.[7] .............................................. B60R 21/00
(52) U.S. Cl. ...................... 180/271; 280/731; 280/732; 280/743.1
(58) Field of Search ............................ 280/728.1, 734, 280/735, 743.1, 731, 732, 728.3; 180/274, 271, 282

(56) References Cited

U.S. PATENT DOCUMENTS

| 3,837,669 A | * | 9/1974 | Nagazumi et al. | 280/728.1 |
|---|---|---|---|---|
| 4,332,398 A | * | 6/1982 | Smith | 280/732 |
| 5,160,164 A | * | 11/1992 | Fischer et al. | 280/743 |
| 5,242,192 A | * | 9/1993 | Prescaro et al. | 280/730.1 |
| 5,316,336 A | * | 5/1994 | Taguchi et al. | 280/730 |
| 5,360,231 A | * | 11/1994 | Adams | 280/728.1 |
| 5,364,124 A | * | 11/1994 | Donegan et al. | 280/730.1 |
| 5,452,913 A | * | 9/1995 | Hansen et al. | 280/728.1 |
| 5,498,030 A | * | 3/1996 | Hill et al. | 280/743.1 |
| 5,564,734 A | * | 10/1996 | Stuckle | 280/730.2 |
| 5,628,527 A | * | 5/1997 | Olson et al. | 280/730.2 |
| 5,707,078 A | * | 1/1998 | Swanberg et al. | 280/739 |
| 5,890,734 A | * | 4/1999 | Saderholm | 280/730.2 |
| 5,906,393 A | * | 5/1999 | Mazur et al. | 280/735 |
| 5,967,548 A | * | 10/1999 | Kozyreff | 280/735 |
| 6,018,693 A | * | 1/2000 | Blackburn et al. | 701/45 |
| 6,122,992 A | * | 9/2000 | Papandreou | 74/552 |
| 6,158,768 A | * | 12/2000 | Steffens et al. | 280/735 |

* cited by examiner

Primary Examiner—Paul N. Dickson
Assistant Examiner—Deanna Draper

(57) ABSTRACT

A vehicle occupant gas restraining system including at least one gas generator located in front of a vehicle seat and adapted to discharge a gas flow into an occupant compartment of a vehicle toward a vehicle occupant seated on the vehicle seat within the vehicle when the gas generator is activated during a vehicle collision. The gas flow is adapted to come into contact with the occupant's body, to form an enlarged occupant-contact area, and to exert a pressure on the occupant's body, thereby reducing an inertial force of the occupant's body and restraining the vehicle occupant from forward inertial movement during the vehicle collision. The entire process of restraining the vehicle occupant takes place in a fraction of a second, and it will not interfere with the driver's visibility or the ability to steer or operate other controls.

9 Claims, 4 Drawing Sheets

VEHICLE OCCUPANT GAS RESTRAINING SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not applicable

BACKGROUND OF THE INVENTION

The present invention relates to a vehicle occupant restraining system, in particular to a gas restraining system which discharges a flow of gas toward a vehicle occupant and restrains the vehicle occupant from forward inertial movement during a vehicle collision.

Starting in model year 1999, the federal government required automakers to install driver and passenger air bags for frontal protection in all cars, light trucks, and vans. Still, about 30,000 occupants die in crashes on U.S. roads each year. Most of these people die in frontal crashes.

For reducing a chance of injury in a crash, all occupants, sitting in vehicles having air bags, should be properly restrained, regardless of size. All front seat passengers (adults and children) should move the seat as far rearward as possible, and may tilt the seat back slightly to help maximize the distance between the passenger's chest and the instrument panel. In order to allow the air bag to deploy safely, front seat passengers should avoid leaning or reaching forward, keeping the arms away from the area in which the air bag will deploy, and should remain seated against the vehicle seat back, with as little slack in the belt as possible to minimize forward movement in a crash.

Air bags inflate with great force. If occupants unrestrained, leaning forward, sitting side ways or out of position in any way, they are at greater risk of injury or death in a crash and may also receive serious or fatal injuries from the air bag if driver or passenger is up against it when it inflates.

A big risk of serious or fatal injury offer current air bags to identifiable groups of people, for example, people who cannot avoid sitting extremely close to air bags, people with certain medical conditions, elderly people, and young children.

Some number of people may still be at risk because they will be more likely than the general population to be too close to their air bags.

When the steering wheel and the dashboard air bags inflate, a fairly loud noise may be heard, followed by release of smoke. This smoke is actually powder from the airbag's surface. The smoke may cause irritation and choking. Those with a history of breathing trouble should get fresh air promptly.

Air bags had caused the death of many occupants in low speed crashes. All crashes in which children were killed due to impacts from the air bag.

The energy required to inflate air bags can injure occupants on top of, or very close to, air bags as they begin to inflate. In the first few milliseconds of inflation, the forces can seriously injure anyone struck by and inflating air bag. Serious inflation injuries occur because of occupants' positions when the air bags begin inflating. Anyone on top of, or very close to, an air bag as it begins to inflate is at risk. This is why most air bag deaths involve occupants who were positioned improperly. Other occupants at risk include drivers who sit or who lean forward in their seats, so they are very close to the steering wheel, infants in rear-facing restraints, and small children, positioned in front of passenger air bags. The more serious injuries range from broken arms and ribs to torn heart valves and bruised lungs.

Research indicates that air bags mainly kill infants, children, short women, and the elderly. Most deaths are the result of severe injuries to the brain, spinal or heart.

BRIEF SUMMARY OF THE INVENTION

This invention is directed to a vehicle occupant gas restraining system for restraining and protecting a vehicle occupant during a vehicle collision.

The object of the present invention is to provide a restraining system which restrains a vehicle occupant from forward inertial movement during a vehicle collision.

The vehicle occupant gas restraining system comprises means for sensing a crash of a vehicle and at least one gas generator or gas source located in front of the vehicle seat.

The gas generator is adapted to discharge a gas flow into a vehicle occupant compartment toward a vehicle occupant seated on the vehicle seat when the gas generator is activated during a vehicle collision. The gas flow is adapted to come into contact with the occupant's body, to form an enlarged occupant-contact area, and to exert a pressure on the occupant's body, thereby reducing an inertial force of the occupant's body and restraining the vehicle occupant from forward inertial movement during the vehicle collision. The gas flow can have a predetermined, or an adjustable, or a modulative force or power based on crash severity and on weight of a vehicle occupant.

The gas flow is directed at the vehicle occupant through an expanding or divergent guide device or nozzle which can be adjustable. At least portion of the guide device or nozzle is adapted to be in a folded position or condition prior to deployment and is adapted to be in an unfolded position or condition during deployment when the gas generator discharges the gas flow. At least portion of the expanding guide device or nozzle is made of a flexible material.

The gas generators may be located in a center of the steering wheel, in a dashboard, and at any other suitable locations for the front seat occupants, and the gas generators may be located in an outside of the seatback of the front seats for the rear seat occupants.

The gas generator is designed to generate a gas flow in a moderate to severe frontal collision.

The entire process of a gas generation, a gas flow direction at a vehicle occupant, and a stop of the gas generation takes place in a fraction of a second, and it will not interfere with the driver's visibility, or the ability to steer or operate other controls.

In comparison with current air bags in existing and new vehicles which may cause serious or fatal injuries during a vehicle collision described in the "Background of the invention," the objects and advantages of the vehicle occupant gas restraining system of the present invention, during a vehicle collision, are:

(a) to provide a gas restraining system which restrains and protects an occupant, sitting in vehicle seat, from moving to the side where the vehicle is impacted and from receiving serious or fatal injuries;

(b) to provide a gas restraining system which reliably stops the occupant's body independently of the occupant's height and age;

(c) to provide a gas restraining system which secures an occupant independently from a distance to the dashboard or steering wheel for the front seat occupant, and from a distance to the seatback of the front seats for the rear seat occupant; and (d) to provide a gas restraining system which secures an occupant independently of the occupant's position in the seat.

Additional objects, advantages, and features of the present invention will become apparent from the following detailed description, taken together with the accompanying drawings.

BRIEF DESCRIPTION OF THE SEVERAL VIEWS OF THE DRAWING

The present invention, both as to its structure and manner of operation, may best be understood by referring to the following detailed description, taken in accordance with the accompanying drawings in which.

DETAILED DESCRIPTION OF THE INVENTION

Figure 1:
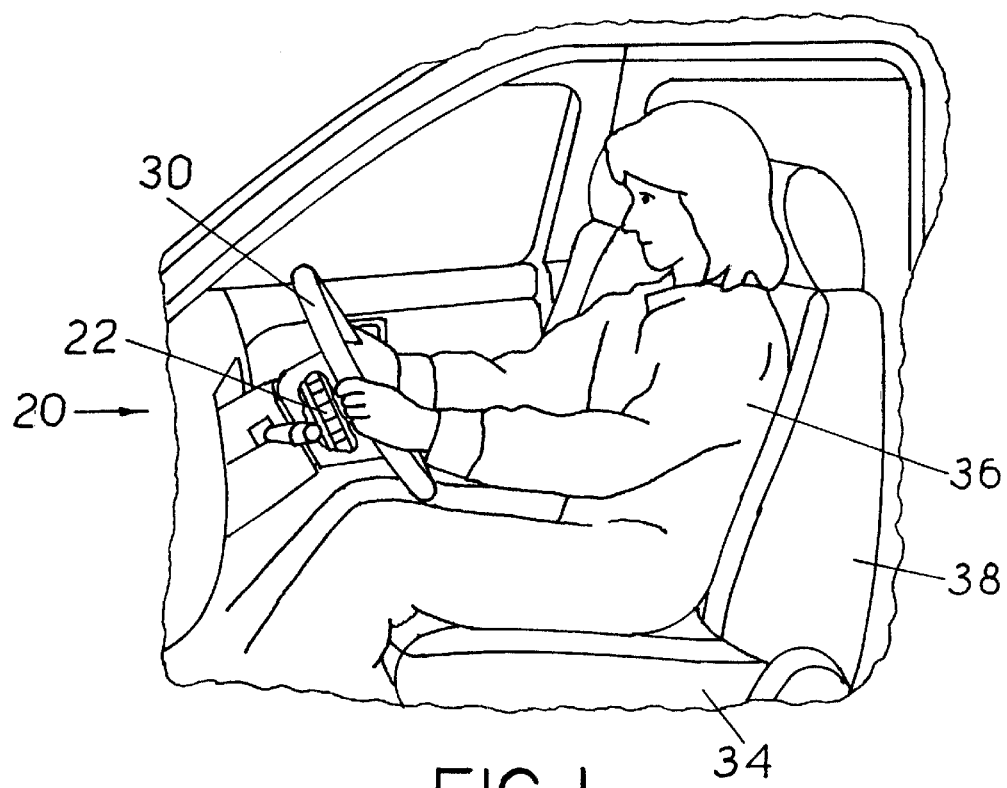
FIG. 1 is a perspective view of a driver's side vehicle interior with a gas restraining system located in the center of the steering wheel in accordance with a first embodiment of the present invention, shown in a condition in which the gas restraining system has not been activated.
Figure 2:
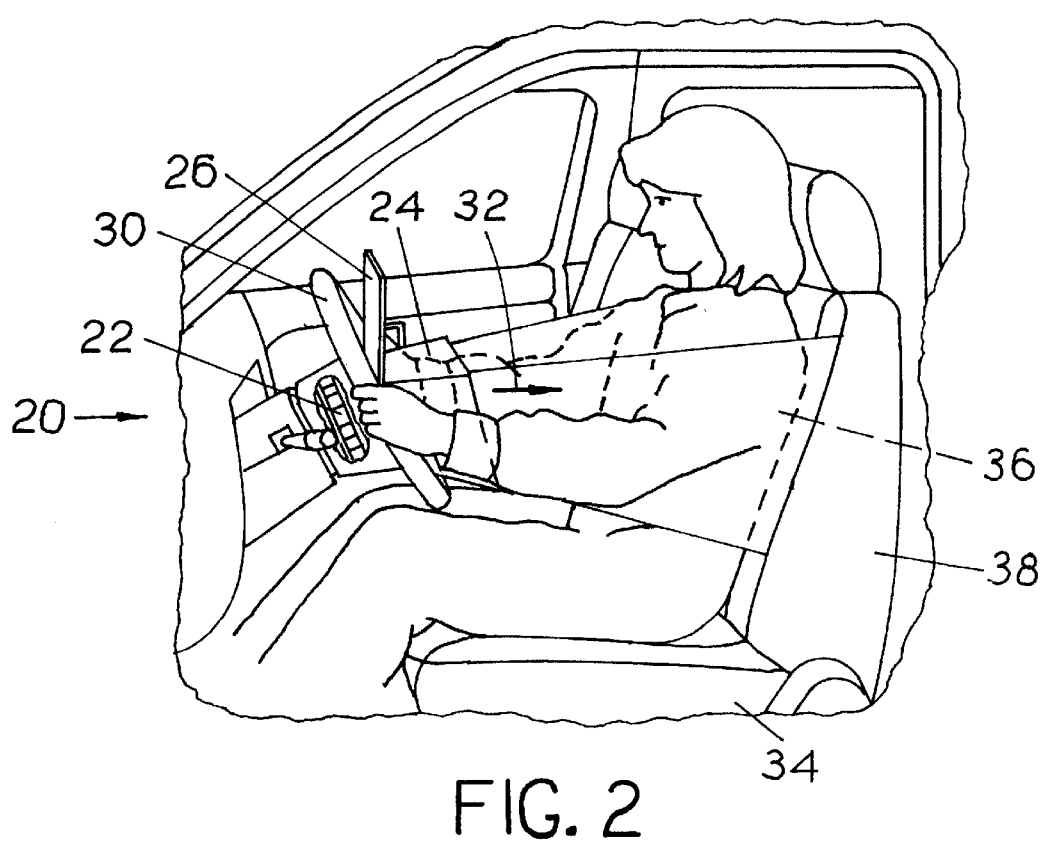
FIG. 2 is a perspective view of the driver's side vehicle interior of FIG. 1 with the gas restraining system activated.
Figure 6:
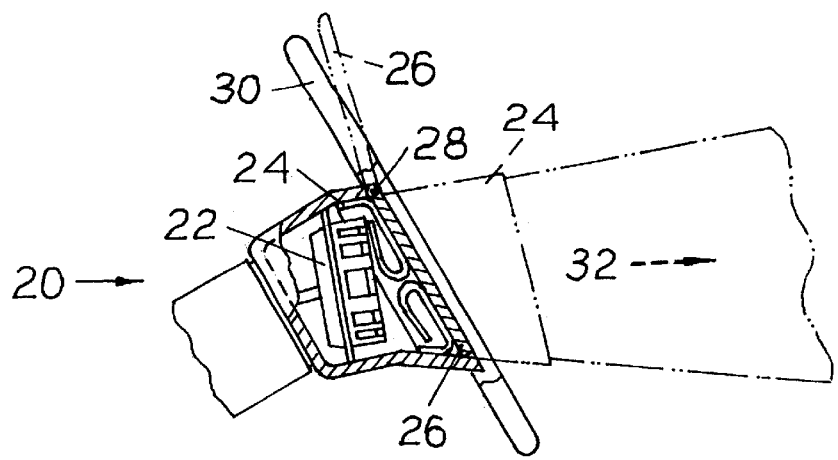
FIG. 6 is an enlarged side view of the gas restraining system of FIG. 1, shown for a usual condition in continuous lines and for activated condition in broken lines.

A first embodiment of the vehicle occupant gas restraining system of the present invention for the front seat occupant (driver) is illustrated in FIGS. 1,2, and 6. The first embodiment of the vehicle occupant gas restraining system 20 comprises: means for sensing a crash of a vehicle (not shown), at least one gas generator or gas source 22 located in the center of the steering wheel 30, an expanding or divergent guide device or nozzle 24 which is joined to the gas generator 22, a cover 26, and a hinge 28. The gas generator 22 may be located at any other suitable location in front of the driver's seat 34.

Figure 3:
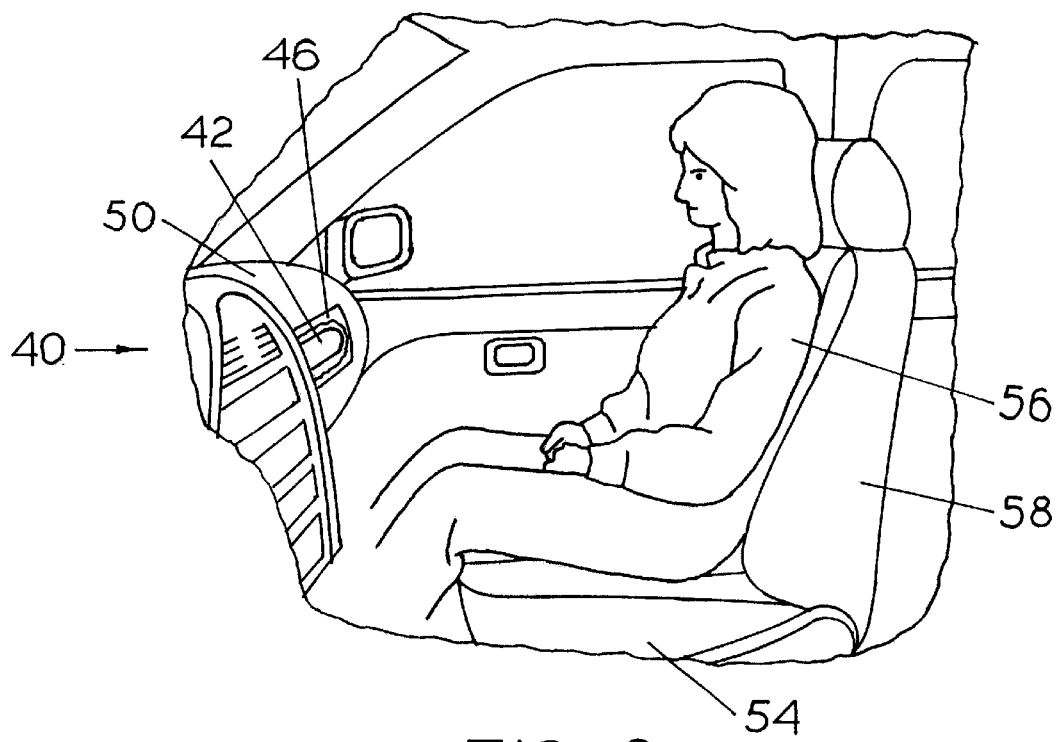
FIG. 3 is a perspective view of a front passenger's side vehicle interior with a gas restraining system located in the dashboard in accordance with a second embodiment of the present invention, shown in a condition in which the gas restraining system has not been activated.
Figure 4:
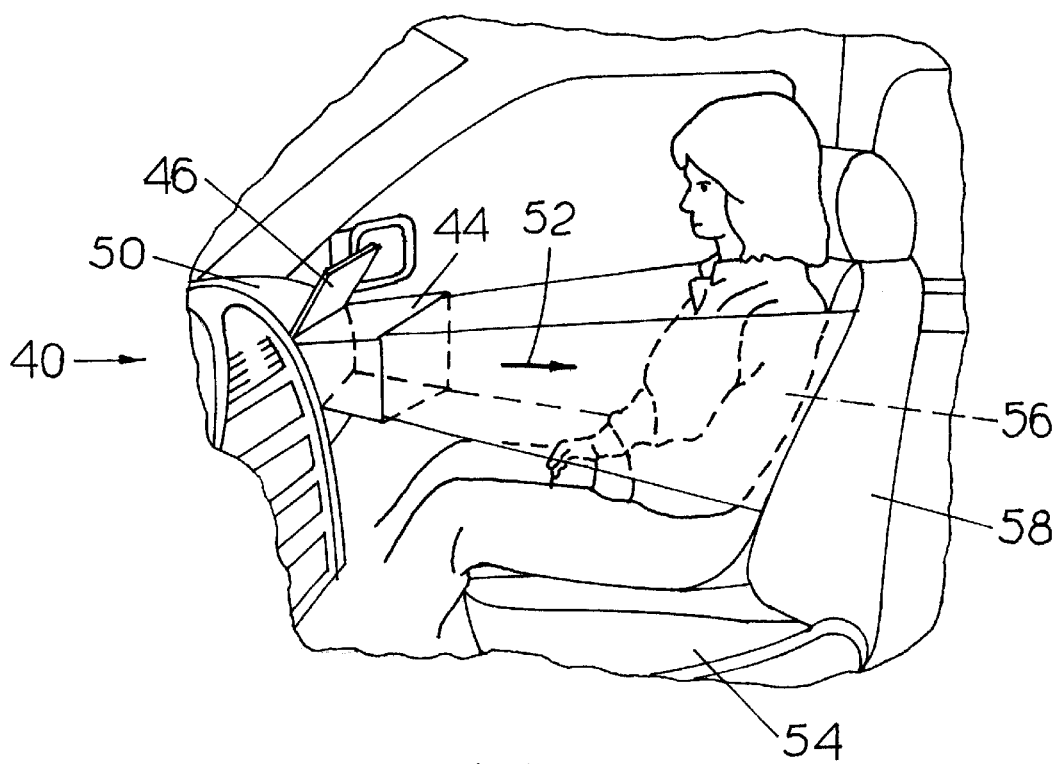
FIG. 4 is a perspective view of the front passenger's side vehicle interior of FIG. 3 with the gas restraining system activated.
Figure 7:
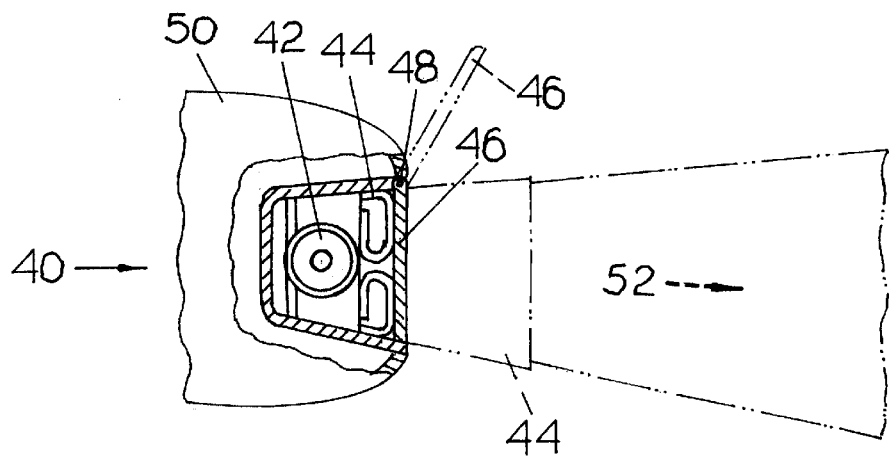
FIG. 7 is an enlarged side view of the gas restraining system of FIG. 3, shown for a usual condition in continuous lines and for activated condition in broken lines.

A second embodiment of the vehicle occupant gas restraining system of the present invention for the front seat occupant (passenger) is illustrated in FIGS. 3,4, and 7. The second embodiment of the vehicle occupant gas restraining system 40 comprises: means for sensing a crash of a vehicle (not shown), at least one gas generator or gas source 42 located in the dashboard 50, an expanding or divergent guide device or nozzle 44 which is joined to the gas generator 42, a cover 46, and a hinge 48. The gas generator 42 may be located at any other suitable location in front of the passenger's seat 54.

Figure 5:
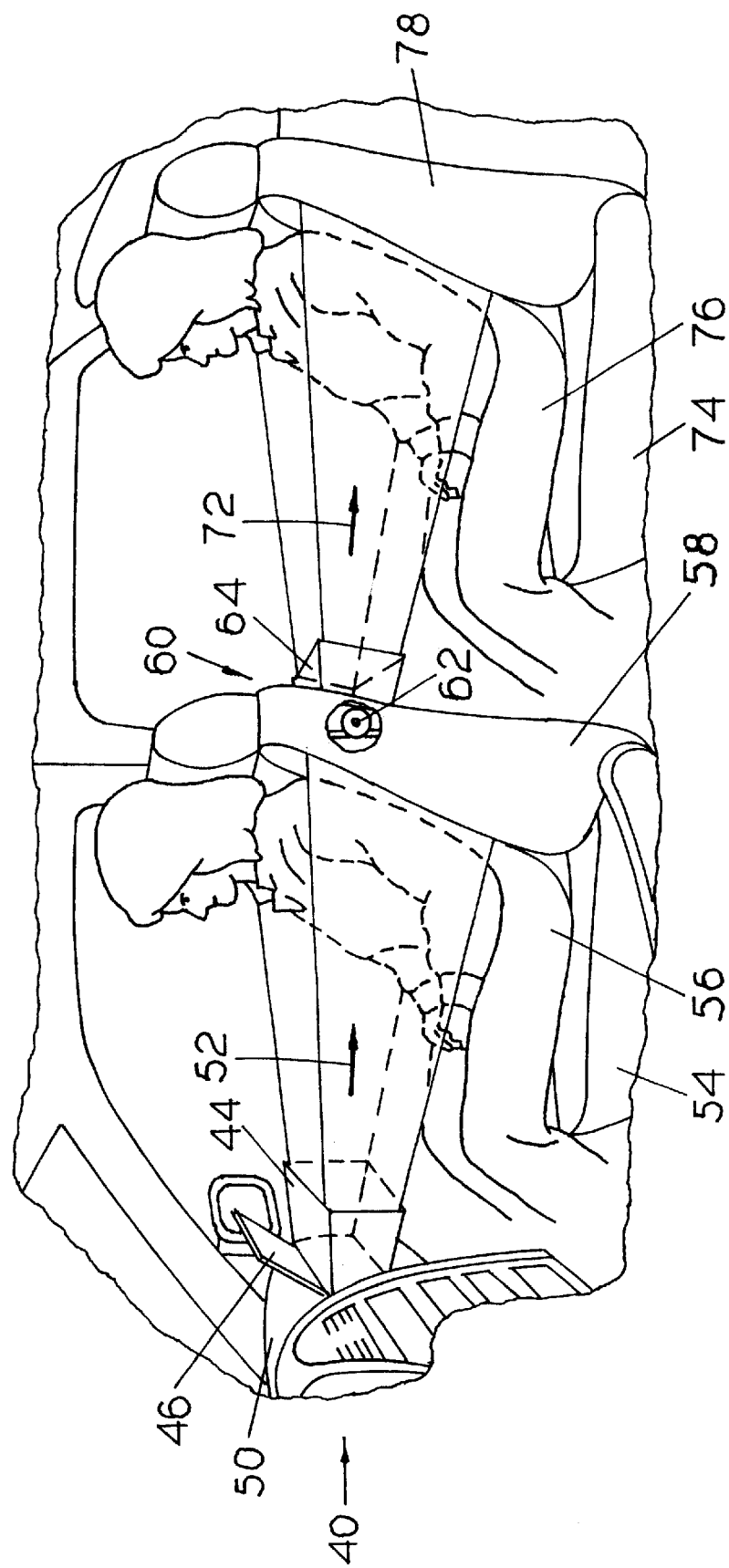
FIG. 5 is a perspective view of a front and a rear passengers' side vehicle interior with gas restraining systems located in the dashboard and in the outside of the seatback of the front passenger's seat in accordance with a third embodiment of the present invention with the gas restraining systems activated.
Figure 8:
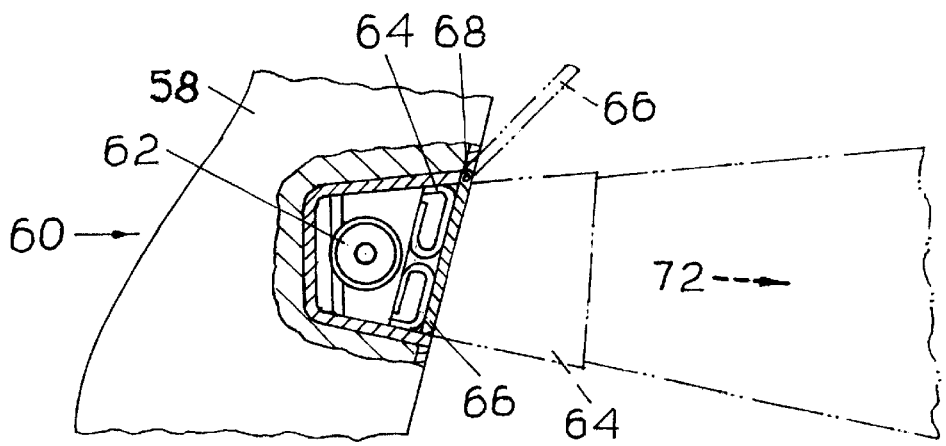
FIG. 8 is an enlarged side view of the gas restraining system of FIG. 5, shown for a usual condition in continuous lines and for activated condition in broken lines.

A third embodiment of the vehicle occupant gas restraining system of the present invention for the rear seat occupants is illustrated in FIGS. 5 and 8. The third embodiment of the vehicle occupant gas restraining system 60 comprises: means for sensing a crash of a vehicle (not shown), at least one gas generator or gas source 62 located in the outside of the seatback 38 of the driver's seat 34 (FIGS. 1 and 2) or in the outside of the seatback 58 of the front passenger's seat 54 (FIGS. 3 and 4), an expanding or divergent guide device or nozzle 64 which is joined to the gas generator 62, a cover 66, and a hinge 68.

The first, second, and third embodiments of the vehicle occupant gas restraining system 20 (FIGS. 1,2, and 6), 40 (FIGS. 3, 4, and 7), and 60 (FIGS. 5 and 8) of the present invention, during a vehicle collision, work in the following ways:

When sensors (not shown) detect a selected or a predetermined severity frontal collision and signal the control unit (not shown) to generate gas, the gas generator 22 located in the center of the steering wheel 30 (FIGS. 1, 2, and 6), or the gas generator 42 located in the dashboard 50 (FIGS. 3, 4, and 7), or the gas generator 62 located in the outside of the seatback 38 of the driver's seat 34 (FIGS. 1 and 2) or in the outside of the seatback 58 of the front passenger's seat 54 (FIGS. 3 and 4) being activated instantly generates gas and swings the cover 26 (FIGS. 2 and 6), or 46 (FIGS. 4 and 7), or 66 (FIG. 8) up on its hinge 28, or 48, or 68. The activated gas generator directs a flow of the gas 32 (FIGS. 2 and 6), or 52 (FIGS. 4 and 7), or 72 (FIGS. 5 and 8) at a front seat vehicle occupant (driver) 36 (FIG. 2), or at a front seat vehicle occupant (passenger) 56 (FIG. 4), or at a rear seat vehicle occupant 76 (FIG. 5). The force of the gas flow 32 (FIGS. 2 and 6), or 52 (FIGS. 4 and 7), or 72 (FIGS. 5 and 8) is directed toward the seatback 38 (FIGS. 1 and 2), or 58 (FIGS. 3 and 4), or 78 (FIG. 5) of the driver's seat 34 (FIGS. 1 and 2), or the front passenger's seat 54 (FIGS. 3 and 4), or the rear passenger's seat 74 (FIG. 5) and exerts a pressure on the body of the vehicle occupant seated on the vehicle seat when the gas flow comes into contact with the occupant's body, thereby reducing an inertial force of the occupant's body and restraining the vehicle occupant from forward inertial movement during the vehicle collision.

The gas flow can have a predetermined, or an adjustable, or a modulative force or power based on crash severity and on weigh of a vehicle occupant.

The gas flow is directed at the vehicle occupant through an expanding or divergent guide device or nozzle 24 (FIGS. 2 and 6), or 44 (FIGS. 4 and 7), or 64 (FIGS. 5 and 8) which can be adjustable. At least portion of the guide device or nozzle is adapted to be in a folded position or condition prior to deployment and is adapted to be in an unfolded position or condition during deployment when the gas generator discharges the gas flow. At least portion of the expanding guide device or nozzle is made of a flexible material.

The entire process of a gas generation, a gas flow direction at a vehicle occupant, and a stop of the gas generation takes place in a fraction of a second, and it will not interfere with the driver's visibility, or the ability to steer or operate other controls.

In comparison with current air bags in existing and new vehicles which may cause serious or fatal injuries during a vehicle collision, the present invention of the vehicle occupant gas restraining system will allow to protect a great number of occupants from receiving serious or fatal injuries.

While there has been shown and described preferred embodiments of the vehicle occupant gas restraining system of this invention, it is understood that various changes and modifications may be made by those skilled in the art without departing from the invention. The invention is defined in the following claims.

I claim:

1. A vehicle occupant gas restraining system without an air bag comprising:

at least one gas generator located in front of a vehicle seat and adapted to discharge a gas flow into a vehicle occupant compartment toward a vehicle occupant seated on said vehicle seat within a vehicle when said at least one gas generator is activated during a vehicle collision;

said gas flow being adapted to come into direct contact with said vehicle occupant's body to form an enlarged occupant-contact area, and to exert a pressure on said vehicle occupant's body, so as to reduce an inertial force of said vehicle occupant's body and to restrain said vehicle occupant from forward inertial movement during said vehicle collision.

2. The vehicle occupant gas restraining system of claim 1 wherein: said gas generator includes an expanding guide device for directing said gas flow toward said vehicle occupant, at least portion of said expanding guide device is adapted to be in a folded position prior to deployment and is adapted to be in an unfolded position during deployment when said gas generator discharges said gas flow.

3. The vehicle occupant gas restraining system of claim 2 wherein: at least a portion of said expanding guide device is made of a flexible material.

4. A vehicle occupant gas restraining system without an air bag comprising:

at least one gas generator adapted to discharge a gas flow into a vehicle occupant compartment toward a vehicle occupant seated on a vehicle seat within a vehicle when said at least one gas generator is activated during a vehicle crash of a selected severity;

said gas flow being adapted to come into direct contact with said occupant's body to form an enlarge contact surface with said occupant's body, and to exert a pressure on said occupant's body, thereby reducing an inertial force of said occupant'body and restraining said vehicle occupant from movement to a side where the vehicle is impacted during said vehicle crash of a selected severity.

5. The vehicle occupant gas restraining system of claim 4 further comprising: at least a one divergent nozzle for directing said gas flow into said vehicle occupant compartment toward said vehicle occupant, at least portion of said divergent nozzle is adapted to be in a folded condition prior to deployment and is adapted to deploy and unfold when said gas generator discharges said gas flow.

6. The vehicle occupant gas restraining system of claim 5 wherein: at least a portion of said divergent nozzle is made from a flexible material.

7. A vehicle occupant gas restraining system without an air bag comprising:

at least one gas generator located within a vehicle and adapted to discharge a gas flow toward a vehicle occupant located within said vehicle when said at least one gas generator is activated during a vehicle collision;

said gas flow being adapted to come into direct contact with said vehicle occupant's body and to exert a pressure on said vehicle occupant's body seated on a vehicle seat, thereby reducing an inertial force of said vehicle occupant's body and restraining said vehicle occupant from forward inertial movement during said vehicle collision.

8. The vehicle occupant gas restraining system of claim 7 wherein: said gas generator includes a guide device for directing said gas flow toward said vehicle occupant when said gas generator discharges said gas flow.

9. The vehicle occupant gas restraining system of claim 8 wherein: at least a portion of said guide device is made of a flexible material.

* * * * *